United States Patent Office 2,810,708
Patented Oct. 22, 1957

2,810,708

STABILIZATION OF FORMALDEHYDE POLYMERS WITH HYDRAZINES

Michael A. Kubico, Newark, and Robert N. MacDonald, Robert L. Stearns, and Frederick A. Wolff, Wilmington, Del., assignors to E. I. du Pont de Nemours and Company, Wilmington, Del., a corporation of Delaware No Drawing. Application December 23, 1952,
Serial No. 327,691

4 Claims. (Cl. 260—45.9)

This invention relates to high molecular weight polymers of formaldehyde, and more specifically, it relates to stabilized compositions of such high polymers.

In copending applications, U. S. Serial Numbers 365,234 and 365,235 filed by R. N. MacDonald on June 30, 1953; 365,278 filed by M. F. Bechtold and R. N. MacDonald on June 30, 1953; and 408,172 filed by R. N. MacDonald on February 4, 1954, now U. S. Patent No. 2,768,994, there are disclosed methods of preparing novel high polymers of formaldehyde which can be formed into tough, flexible films that retain their toughness and flexibility over long periods of time. The prior art teaches that polymers of formaldehyde of moderately high molecular weight can be made which initially possess desirable properties. These known polymers can be formed into films or other articles that are tough and flexible, but the polymer degrades quickly when heated at an elevated temperature, e. g., 105° C., as evidenced by generation of formaldehyde fumes, and embrittlement of films prepared therefrom. The above-cited copending applications describe certain methods of obtaining formaldehyde polymers which retain their desirable toughness and flexibility.

It is an object of the present invention to provide, as new compositions of matter, stabilized formaldehyde polymers. It is another object of this invention to provide stabilizers which can be incorporated into unstable formaldehyde polymers and thereby produce stable formaldehyde polymers. It is another object of this invention to provide methods of incorporating stabilizing compounds into preformed formaldehyde polymers to produce formaldehyde polymers having improved toughness, flexibility, and thermal stability.

The above objects are accomplished by intimately associating a minor amount of a hydrazine with a formaldehyde polymer, preferably one having an inherent viscosity of at least 1, measured at 60° C. as a 0.5% solution in p-chlorophenol containing 2% alpha-pinene.

A convenient way of preparing the new compositions of this invention is to dissolve the hydrazine in a volatile solvent and then add an amount of solution to the polymer sufficient to provide from 0.001% to 10% of the hydrazine by weight of the polymer. The solvent thereafter may be removed conveniently by evaporation. Alternatively, the hydrazine can be incorporated into the molten polymer.

It is believed that the chain of a formaldehyde polymer having recurring —$CH_2O$— units is subject to attack by three separate mechanisms. Firstly, the hydrogen atoms are subject to an oxidative attack by oxygen or by free radicals having an oxidative tendency. Secondly, the oxygen of the polymer chain is subject to hydrolytic attack by hydrogen ion or its equivalent. Both the oxidative and hydrolytic attack are believed to cause chain cleavage of the polymer. The third attack is one which is believed to start at the end of a polymer chain to cause an unzippering effect, in that the end formaldehyde unit is broken away and then the next unit, and so on until a strong unit is reached that will not break away. These three mechanisms may be inhibited by the presence of scavenger compounds for destroying free oxidative radicals and compounds causing hydrolytic attack, and by the formation of strong end groups on the polymer chain. Although it is not known to be true, it is believed that the hydrazines of this invention find their primary use in scavenging the oxidative radicals from the polymer environment, although they may also help to prevent hydrolytic atack and to form some strong end groups on the polymer chains. The above theory is presented as the most likely explanation of the chemistry of this invention, but it is not meant to limit this invention in any manner other than by the claims appended hereto.

The examples which follow are submitted to illustrate and not to limit this invention. Percentage weight loss is used as one criterion of stability, representing the percentage lost in weight after heating the polymeric articles in a circulating oven for the period of time shown.

*Example 1.*—A sample of a formaldehyde polymer, prepared as described subsequently, was treated with an ether solution of tetraphenylhydrazine in an amount sufficient to provide 2% of the hydrazine based on the weight of the polymer. A similar sample was prepared using 1,1-diphenyl-2-methacryloylhydrazine in place of tetraphenylhydrazine, but otherwise identical in every respect. After evaporation of the solvent and air-drying for several days, the two treated samples and an untreated control sample were compression-molded at 190° C. and 2000 lb./sq. in. pressure to form films 5 mils in thickness. These films were then heated in a circulating air oven held at 105° C. and the samples examined periodically for toughness and weight loss. Toughness was determined by folding the film through 180°, creasing, folding in the reverse direction through 360°, and creasing again. This cycle was repeated if the films did not fail. The films were judged to be brittle if they failed in the first cycle. Table I shows the results obtained by testing the unstabilized sample and the two stabilized samples for weight loss and toughness after one week and two weeks in a circulating air oven held at 105° C. In Table I, "brittle" means that the sample failed in the first creasing, and "tough" that there was no evidence of failure after 100 creasing cycles.

Table I

| Stabilizer | Percent Weight Loss | | Toughness | |
|---|---|---|---|---|
| | 1 week | 2 weeks | 1 week | 2 weeks |
| None | 5.6 | 22.8 | Tough | Brittle. |
| Tetraphenylhydrazine | 7.6 | 9.4 | ___do___ | Tough. |
| 1,1 - Diphenyl - 2 - methacryloylhydrazine. | 6.2 | 8.6 | ___do___ | Do. |

The formaldehyde polymer used in the above tests was prepared as follows:

Three hundred fifty grams of anhydrous ether was placed in a 2-liter flask equipped with a mechanical stirrer and gas inlets and outlets. The flask was cooled in a Dry-Ice/acetone bath and the ether was stirred rapidly as formaldehyde gas was passed into the ether. The monomeric formaldehyde was obtained by pyrolyzing alphapolyoxymethylene under 100 mm. pressure and then purifying the pyrolysis product by passing it at this pressure through 12 U-shaped traps held at —40° C. An ether solution of formaldehyde was obtained and was freed from the film of polymer on the walls of the flask and traces of floating solid by gravity filtration. The clear filtered solution was then stirred rapidly under nitrogen at atmospheric pressure and held at —70° C. to —75° C. as 0.06 gram of n-butylamine (0.024 mole percent) in 28 grams of ether was added gradually over a 43-minute period from a burette. The white granular formaldehyde polymer which formed was found to have an inherent viscosity of 2.3, measured at 60° C. as a 0.5% solution in p-chlorophenol containing 2% alpha-pinene.

*Example 2.*—Two grams of a formaldehyde polymer, prepared by a procedure similar to that of Example 1, 0.05 gram of one of the hydrazines listed in Table II below, and 7.1 grams of ether were mixed and stirred with a spatula. After standing overnight, the ether was removed by vacuum evaporation. The treated samples and an untreated control sample were then placed for one hour in a vacuum oven held at 135° C. The samples were then treated at 180° C. for 30 minutes under nitrogen and thereafter weighed. The percentage difference in weight before and after this treatment at 180° C. is referred to in Table II as "percent weight loss."

Table II

| Stabilizer | Percent Weight Loss |
| --- | --- |
| None | 8.9 |
| Tetraphenylhydrazine | 2.5 |
| 1,1-diphenyl-2-methacryloylhydrazine | 4.4 |

*Example 3.*—Three grams of a formaldehyde polymer, prepared similarly to the polymer of Example 1, was mixed with 0.06 gram of adipic dihydrazide in 10 grams of diethyl ether, the mixture was stirred with a spatula and after standing overnight the solvent was removed under vacuum. After additional drying overnight in a desiccator, the weight loss was determined as in Example 2 and found to be 10.4%. An untreated control under the same conditions lost 16.0% by weight.

*Example 4.*—One part of tetraphenyltetrazene was incorporated by dry grinding into 50 parts of finely divided formaldehyde polymer (inherent viscosity 1.75), prepared as described in the application of R. N. Mac-Donald, U. S. Serial Number 408,172, filed by R. N. MacDonald on February 4, 1954, now U. S. Patent No. 2,768,994. Exactly one-half gram of the resulting composition was pressed between aluminum foils in a Carver Laboratory Press for exactly five minutes at 200° C. under a ram pressure of 3000 pounds. At the end of this time, the specimen was removed from the press, immediately cooled, and then carefully weighed. The weight loss was compared with that of a control sample of the same formaldehyde polymer without stabilizer. The sample containing the tetraphenyltetrazene lost 9.1% in weight, whereas the untreated sample lost 19.7% in weight.

*Example 5.*—Two grams of a formaldehyde polymer (inherent viscosity 2.4), prepared by bulk polymerization at −80° C. (bulk polymerization is accomplished by allowing liquid formaldehyde to stand until it polymerizes into a solid block of polymer) and thereafter ground to 20-mesh size, was stirred with a solution of 0.04 gram of phenylhydrazine in 7.1 grams of diethyl ether and allowed to stand in a closed container for one hour. The container was then opened and the ether removed by passing a slow stream of nitrogen over the mixture. A portion of this treated formaldehyde polymer was compression molded at 180° C. and at 190° C. into films 4.5 and 5 mils thick, respectively. Thereafter these films were exposed in a circulating air oven at 105° C. for seven days, after which the films were folded through 180°, creased, refolded through 360° and creased on the same line for 100 cycles without failure. A similarly prepared film of the untreated bulk polymerization product became brittle after heating for only one day at 105° C. in air, as judged by its failure to withstand a single 180° creasing.

*Example 6.*—Formaldehyde polymer, prepared by bulk polymerization as described in Example 5, and acetylphenylhydrazine were mixed together on a mill equipped with two electrically heated rolls 2 inches in diameter by 6 inches long. In making the blends the acetylphenylhydrazine was mechanically mixed in the solid state with the formaldehyde polymer powder and the composition then poured on the milling rolls for further mixing. Table III shows the compositions tested and the results obtained.

Table III

| Composition | Amount of Formaldehyde polymer (grams) | Amount of Acetylphenylhydrazine (grams) | Milling Time (min.) | Inherent Viscosity after Milling | Percent Weight Loss during Film molding | Percent Weight Loss of film at 105° C. after— | | | |
| --- | --- | --- | --- | --- | --- | --- | --- | --- | --- |
| | | | | | | 1 day | 7 days | 14 days | 21 days |
| 1 | 25 | 0 | (¹) | 0.97 | (¹) | | | | |
| 2 | 25 | 0.5 | 20 | 2.03 | 3.7 | 9.02 | 11.75 | 12.98 | 13.82 |
| 3 | 25 | 0 | (¹) | 1.67 | (¹) | | | | |
| 4² | 11 | | 5 | | 6.5 | 8.69 | 10.63 | 11.56 | 12.25 |

¹ The polymer was so degraded by the milling treatment that a film could not be made therefrom.
² This is a sample of composition 2 taken after the milling shown for composition 2 and subjected to additional milling as shown for composition 4.

In compositions 1, 2, and 4, 25 grams of formaldehyde polymer was utilized, acetylphenylhydrazine being mixed with composition 2, while compositions 1 and 3 were left untreated as controls. Composition 4 was an 11-gram sample of composition 2 taken after it had been milled once. Thus composition 4 was milled twice. The milling rolls were maintained at different temperatures, one being about 180° C. while the other was about 170° C.

Inherent viscosities shown were measured on the milled samples. The inherent viscosity of the unmodified formaldehyde polymer used in these compositions before milling was 2.03. Compositions 1 and 3 did not survive the milling treatment because they either crumbled or melted too sharply and therefore could not be worked. Compositions 2 and 4 reacted well to the milling treatment, forming sheets on the milling rolls which could be peeled off and which were very tough. Films were made from compositions 2 and 4 by compression molding at 200° C. and 10,000 pounds ram pressure for 1 minute. A comparison of the weight of molding powder used and of the resulting film showed a loss during molding, as recorded in Table III. These films were then placed in a circulating oven at 105° C. and weighed periodically to determine the amount of weight loss after 7, 14, and 21 days in the oven. These films were still tough after 21 days exposure in the oven. The polymer of compositions 1 and 3 could not be molded into a continuous film. Films have been molded, however, from formaldehyde polymers made by bulk polymerization similar to that utilized in this example. Such films become brittle after 1 to 7 days in an oven at 105° C. and have a degree of toughness of 0.

*Example 7.*—Formaldehyde gas from the pyrolysis of 88 grams of alpha-polyoxymethylene was passed through 2 traps at −15° C. and thence into a reactor containing a solution of 0.1 gram of 1,1-diphenyl-2-methacryloylhydrazine and 1 gram of a 50% kerosene solution of an 80:20 copolymer of lauryl methacrylate/beta-diethylaminoethyl methacrylate in 779 grams of cyclohexane. The reaction medium was rapidly agitated while being maintained at 50° C. with a water bath. Polymer precipitated in white granular form throughout the 3.1 hours of pyrolysis. The thick slurry which was formed was filtered and the product extracted with ether, and thereafter air- and vacuum-dried. There was obtained 22 grams of formaldehyde polymer, which exhibited an inherent viscosity of 3.6, measured at 60° C. as a 0.5% solution in p-chlorophenol containing 2% alpha-pinene. A sample of this polymer was heated in the melt at 225° C. for 30 minutes during which time it lost only 14.7% of its weight as compared to a weight loss of 40–45% for polymers prepared similarly but without the 1,1-diphenyl-2-methacryloylhydrazine present during the polymerization.

Toughness is determined on 3 to 7 mils thick films, which have been aged 7 days at 105° C., by creasing the aged film through 180° and then in the reverse direction through 360°. If the film fails to withstand one creasing, its degree of toughness is said to be zero. If it stands one complete creasing cycle but fails in the second, it is said to have a degree of toughness of one, and so forth.

The hydrazines used as stabilizers include hydrazine itself and substituted hydrazines including the hydrazides. Examples of such compounds include hydrazine, tetraphenylhydrazine, tetraanisylhydrazine, adipic dihydrazide, benzoylhydrazine, 1,1-diphenyl-2-methacrylolylhydrazine, hydrazine hydrate, alpha-benzyl-alpha-phenyl-hydrazine, acetylphenylhydrazine, diemthylhydrazine, benzylhydrazine, 1,1 - diphenyl-2-picrylhydrazine, propionoylhydrazide, tolylhydrazine, stearoylhydrazide, dodecylhydrazine, 1,1-diphenyl-2-dodecyl-2-acetylhydrazine, and the like.

The amount of the hydrazine added to the formaldehyde polymer can vary from 0.001% to 10% by weight of the polymer. Best results, however, are obtained using from 0.1% to 5% of the hydrazine, on the weight of the polymer, and this embraces the amount preferably used.

The hydrazine may be incorporated into the polymer in any manner well known to those skilled in the art. A convenient way is to dissolve the hydrazine in a volatile solvent, preferably one which is also at least a partial solvent for the formaldehyde polymer, and to steep the polymer in this solution. Thereafter, the solvent may be removed by evaporation, desirably under reduced pressure. As an alternative, the hydrazine may be added to the polymer and the blend then homogenized by milling, plasticating, or other mixing methods at a temperature above the melting point of the polymer. Another method is to add stabilizer to the polymer at the melting point of the polymer. In still another alternative, the blend may be made by dissolving the hydrazine in a solvent for the polymer and adding the solution to a solution of the polymer in the same solvent. In yet another method the hydrazine may be added to the polymerization system after the polymer has formed, but before isolation of the polymer. In a further variant the hydrazine may be present in the polymerization system. As an example of the last-mentioned alternative, it has been found advantageous to add acetylphenylhydrazine to polymerization systems such as are described by R. N. MacDonald in his copending application, U. S. Serial Number 365,235, filed by R. N. MacDonald on June 30, 1953.

This invention is particularly useful for upgrading low quality polymers and thus for rendering such polymers useful in applications from which they are otherwise excluded. Polymers which are thus upgraded include those made by bulk polymerization as well as the high quality polymers obtained in accord with the process of the before-mentioned copending applications, U. S. Serial Numbers 365,234 and 365,235 filed by R. N. MacDonald on June 30, 1953; 365,278 filed by M. F. Bechtold and R. N. MacDonald on June 30, 1953; and 408,172 filed by R. N. MacDonald on February 4, 1954, now U. S. Patent No. 2,768,994.

As illustrated by the examples, the compositions of this invention are outstanding in their resistance to thermal degradation and in their retention of toughness. It is also known that the compositions of this invention are particularly useful in their resistance to degradation from ultraviolet light radiation.

The stabilized compositions of this invention are useful for conversions to films, fibers, molded articles, and the like, by melt extrusion, injection molding, compression molding, and other fabrication methods known to the art.

We claim:

1. The normally solid, thermally stabilized, polymeric composition which comprises a high molecular weight, film-forming, formaldehyde addition polymer having recurring —CH$_2$O— units in the polymer chain and exhibiting an inherent viscosity of at least 1, said inherent viscosity being measured at 60° C. on a 0.5% solution of said polymer in p-chlorophenol containing 2% by weight of alpha-pinene, and 0.001% to 10% by weight of a member of the group of thermal stabilizing compounds consisting of hydrazine, hydrocarbon-substituted hydrazines, and hydrazides.

2. The composition of claim 1 in which the amount of said thermal stabilizing compound is from 0.1% to 5% by weight of said composition.

3. A film comprising the composition of claim 1.

4. A fiber comprising the composition of claim 1.

References Cited in the file of this patent

UNITED STATES PATENTS 1,793,635    Reed _____ Feb. 24, 1931

FOREIGN PATENTS 561,999    Great Britain _____ June 14, 1944

OTHER REFERENCES

Berichte, vol. 40, pp. 1505–1506 (1907).

"Formaldehyde" by J. F. Walker, pub. by Reinhold Pub. Co., N. Y., 1944, pp. 106–108 and 123.